March 15, 1960   H. L. ROBERSON   2,928,653
VARIABLE ANGLE BLADE FOR FLUID FLOW MACHINES
Filed Dec. 22, 1955
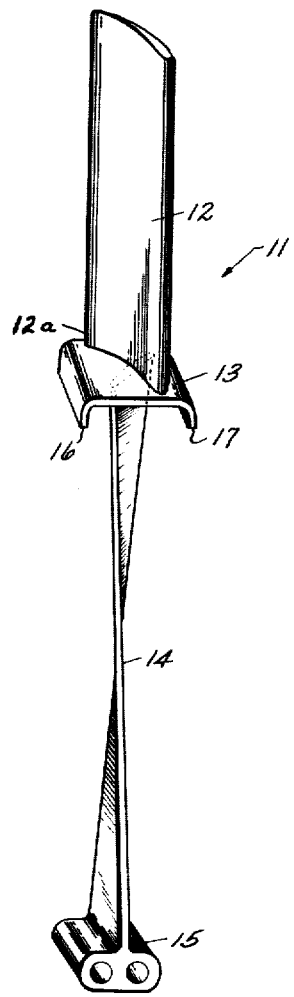
INVENTOR.
HARVEY L. ROBERSON
BY
HIS ATTORNEY

United States Patent Office 2,928,653
Patented Mar. 15, 1960

2,928,653

VARIABLE ANGLE BLADE FOR FLUID FLOW MACHINES

Harvey Lee Roberson, Los Angeles, Calif., assignor to General Electric Company, a corporation of New York Application December 22, 1955, Serial No. 554,717

1 Claim. (Cl. 253—77)

The present invention relates to an improved rotor blade for fluid flow machines and more particularly to a flexible shank blade having a variable angle of attack.

To allow light weight rotor blades to withstand the stresses imposed by the bending loads, an elongated flexible shank has been provided between the air foil section and the supporting wheel. This shank flexes and permits the blade to lean into the centrifugal field until a centrifugal lean moment is created which balances the major part of the bending loads imposed by the working fluid. The light weight blades are sufficiently torsionally flexible that significant changes in angle of attack of the air foil sections occur, due to elastic deflections of the blades from centrifugal and aerodynamic loads. This torsion can be anticipated so that compensation for the centrifugal and aerodynamic twisting of the blades may be introduced by building into the blade an opposite initial or pre-determined twist such that air foil sections are at their proper angle of attack when the engine is at operating speed.

The present invention provides a means for varying the angle of attack of a flexible shank blade in accordance with rotor speed and gas pressure. This is accomplished by providing an initial built-in twist in the flexible shank such that the air foil section will adjust its angle of attack under the application of centrifugal and aerodynamic loads to the correct value for various rotor speeds and pressure loads.

An object of the present invention is the provision of a light weight variable angle rotor blade for fluid flow machines.

Another object is the provision of a light weight flexible shank rotor blade having a variable angle of attack.

A further object is to provide a light weight flexible shank rotor blade in which the angle of attack is automatically varied for various rotor speeds and gas pressures.

Other objects and many of the attendant advantages of this invention will be readily appreciated as the same becomes better understood by reference to the following detailed description when considered in connection with the accompanying drawing wherein is shown a perspective view of a flexible shank rotor blade embodying the present invention.

Referring more particularly to the drawing, the flexible shank blade 11 includes an air foil section 12 adapted to project into the working fluid of a fluid flow machine, such as an axial flow compressor. A platform 13 is attached to the radial inner end or base portion 12a of the air foil section and defines a portion of the inner boundary of the gas path. An elongated flexible shank 14 is attached at its outer extremity to the base portion of the air foil section and to the platform. A blade mounting 15, for securing the blade to a supporting wheel, is affixed to the inner extremity of the flexible shank. The shank section, as shown, is provided with an initial or pre-determined twist about its longitudinal axis so that in its unflexed condition the opposite extremities of the shank lie in angularly related planes. The lateral edges of the platform 13 are turned downwardly to form flanges 16 and 17.

The elastic deflections which cause changes in the angle of attack of a light weight flexible shank rotor blade result from torsional moments caused by centrifugal and aerodynamic loads. The centrifugal forces on the blade may be resolved into two components, one of which produces moments which tend always to rotate the blade toward the plane of rotation and the other of which produces moments tending to remove any initial twist in the blade. The aerodynamic forces acting on the blade also create a moment about the blade elastic axis. If the air foil section of the blade and the shank are provided with the proper initial twist, the combined centrifugal and aerodynamic moments will cause an air foil blade section and shank having properly chosen torsional rigidities to turn the air foil section to the desired angle of attack for various rotational speeds and inlet pressures. Included among the possible arrangements is that in which the initial twist is provided in the flexible shank 14 instead of in the air foil section, so that the angle of attack of the entire air foil section is changed as the shank flexes. The air foil section is prevented from twisting by designing the center of twist close to the center of pressure. The shank is provided with the proper degree of twist and with the proper torsional rigidity so that it will adjust the angle of attack of the air foil section to the correct value for various speeds and pressure loads. The flanges 16 and 17 will abut the similar flanges on adjacent blades when the rotor is operating at designed speed, and prevent the shank from twisting beyond desired limits. It should be noted that the blades twist in the direction of increasing angle of attack as the rotor speed is increased. This is in the direction of alleviating stall during part speed operation, which is the operating regime where typical axial flow compressor forward stage blades are most prone to encounter stall difficulties.

While a particular embodiment of the invention has been illustrated and described, it will be obvious to those skilled in the art that various changes and modifications may be made without departing from the invention and it is intended to cover in the appended claim all such changes and modifications that come within the true spirit and scope of the invention.

What is claimed is:

For use in a fluid flow machine having a rotor, a variable angle rotor blade comprising: an air foil section having a base portion; mounting means, said means rigidly securing said blade to the rotor; and an elongated flexible shank rigidly secured to said base portion and said mounting means, said shank having a built-in pre-determined twist responsive to the centrifugal and aerodynamic forces acting on the air foil section, for automatically varying the angle of attack of the air foil section for various rotor speeds and gas pressures.

References Cited in the file of this patent

UNITED STATES PATENTS

| | | |
|---|---|---|
| 453,361 | Osborne | June 2, 1891 |
| 1,313,598 | Ingells | Aug. 19, 1919 |
| 1,875,998 | Everts | Sept. 6, 1932 |
| 2,032,224 | Paton | Feb. 25, 1936 |
| 2,095,223 | Samuels | Oct. 5, 1937 |
| 2,345,047 | Houghton | Mar. 28, 1944 |
| 2,378,372 | Whittle | June 12, 1945 |
| 2,421,890 | Johansson | June 10, 1947 |

(Other references on following page)

UNITED STATES PATENTS

| | | |
|---|---|---|
| 2,451,106 | Martin | Oct. 12, 1948 |
| 2,477,954 | Blanc | Aug. 2, 1949 |
| 2,510,734 | Bodger | June 6, 1950 |
| 2,599,718 | Munk | June 10, 1952 |
| 2,660,401 | Hull | Nov. 24, 1953 |
| 2,669,383 | Purvis et al. | Feb. 16, 1954 |
| 2,726,844 | Walton | Dec. 15, 1955 |

FOREIGN PATENTS

| | | |
|---|---|---|
| 590,141 | Great Britain | July 9, 1947 |
| 609,322 | Great Britain | Sept. 29, 1948 |
| 662,357 | Great Britain | Dec. 5, 1951 |
| 705,835 | France | Mar. 17, 1931 |